United States Patent
Hansen

(10) Patent No.: US 8,360,331 B2
(45) Date of Patent: Jan. 29, 2013

(54) HARSH OPERATING ENVIRONMENT RFID TAG ASSEMBLIES AND METHODS OF MANUFACTURING THEREOF

(75) Inventor: Kurt S. Hansen, Chesterfield, MO (US)

(73) Assignee: Innovative Timing Systems, LLC, St. Louis, MO (US)

(*) Notice: Subject to any disclaimer, the term of this patent is extended or adjusted under 35 U.S.C. 154(b) by 0 days.

(21) Appl. No.: 13/110,580

(22) Filed: May 18, 2011

(65) Prior Publication Data

US 2011/0233283 A1 Sep. 29, 2011

Related U.S. Application Data

(63) Continuation of application No. PCT/US2010/022559, filed on Jan. 29, 2010.

(51) Int. Cl.
*G06K 19/06* (2006.01)

(52) U.S. Cl. .................................. 235/492; 343/755

(58) Field of Classification Search ............ 340/572.8, 340/572.7

See application file for complete search history.

(56) References Cited

U.S. PATENT DOCUMENTS

| | | |
|---|---|---|
| 4,142,680 A | 3/1979 | Oswald et al. |
| 5,091,895 A | 2/1992 | Chatwin et al. |
| 5,140,307 A | 8/1992 | Rebetez et al. |
| 5,436,611 A | 7/1995 | Arlinghaus, Jr. |
| 5,493,805 A | 2/1996 | Penuela et al. |
| 5,511,045 A | 4/1996 | Sasaki et al. |
| 5,604,485 A | 2/1997 | Lauro et al. |
| 5,696,481 A | 12/1997 | Pejas et al. |
| 5,812,049 A | 9/1998 | Uzi |
| 5,821,902 A | 10/1998 | Keen |
| 5,883,582 A | 3/1999 | Bowers et al. |
| 5,973,598 A | 10/1999 | Beigel |
| 6,008,773 A | 12/1999 | Matsuoka et al. |
| 6,100,804 A | 8/2000 | Brady et al. |
| 6,204,813 B1 | 3/2001 | Wadell et al. |
| 6,278,413 B1 | 8/2001 | Hugh et al. |
| 6,340,932 B1 | 1/2002 | Rodgers et al. |
| 6,369,697 B1 | 4/2002 | Poole |

(Continued)

FOREIGN PATENT DOCUMENTS

| | | |
|---|---|---|
| EP | 2009595 A | 12/2008 |
| JP | 2008-276353 A | 11/2006 |

(Continued)

OTHER PUBLICATIONS

PCT Search Report, PCT US 2010-022559, Jan. 29, 2010.

(Continued)

*Primary Examiner* — Thien M Le
*Assistant Examiner* — Sonji Johnson
(74) *Attorney, Agent, or Firm* — Polster, Lieder, Woodruff & Lucchesi, L.C.

(57) ABSTRACT

A radio frequency identification (RFID) tag assembly and method of manufacturing the assembly including an RFID semiconductor chip having an antenna interface mounted on a mounting substrate and having a predetermined operating frequency, a conductor coupled to the antenna interface and formed on the mounting substrate, an antenna electrically coupled to the conductor having a first radiating element lying in a first plane and a second radiating element lying in a second plane that is at an angle relative to the first plane, and an enclosure having a body with a cavity dimensioned for receiving the mounting substrate and RFID semiconductor chip, the conductor, and the first and second radiating elements, the mounting substrate being positioned proximate to the closed end of the cavity and a seal for closing the opening and sealing the cavity.

32 Claims, 8 Drawing Sheets

U.S. PATENT DOCUMENTS

| | | |
|---|---|---|
| 6,466,178 B1 | 10/2002 | Muterspaugh |
| 6,496,806 B1 | 12/2002 | Horwitz et al. |
| 6,512,478 B1 | 1/2003 | Chien |
| 6,570,487 B1 | 5/2003 | Steeves |
| 6,577,238 B1 | 6/2003 | Whitesmith et al. |
| 6,696,954 B2 | 2/2004 | Chung |
| 6,703,935 B1 | 3/2004 | Chung et al. |
| 6,710,713 B1 | 3/2004 | Russo |
| 6,720,930 B2 | 4/2004 | Johnson et al. |
| 6,812,824 B1 | 11/2004 | Goldinger et al. |
| 6,839,027 B2 | 1/2005 | Krumm et al. |
| 6,888,459 B2 | 5/2005 | Stilp |
| 6,888,502 B2 | 5/2005 | Beigel et al. |
| 6,952,157 B1 | 10/2005 | Stewart et al. |
| 6,963,270 B1 | 11/2005 | Gallagher, III et al. |
| 6,989,750 B2 | 1/2006 | Shanks et al. |
| 6,995,655 B2 | 2/2006 | Ertin et al. |
| 7,009,562 B2 | 3/2006 | Jenabi |
| 7,019,639 B2 | 3/2006 | Stilp |
| 7,057,511 B2 | 6/2006 | Shanks et al. |
| 7,057,975 B2 | 6/2006 | Stobbe |
| 7,508,739 B2 | 3/2009 | Paes |
| 7,589,616 B2 | 9/2009 | Klatsmanyi et al. |
| 7,605,685 B2 | 10/2009 | Stewart et al. |
| 7,605,689 B2 | 10/2009 | Hein et al. |
| 8,085,136 B2 | 12/2011 | Stewart et al. |
| 8,179,233 B2 | 5/2012 | Kia |
| 2002/0008624 A1 | 1/2002 | Paek |
| 2002/0044057 A1 | 4/2002 | Zirbes |
| 2002/0044096 A1 | 4/2002 | Chung |
| 2003/0073518 A1 | 4/2003 | Marty et al. |
| 2003/0163287 A1 | 8/2003 | Vock et al. |
| 2003/0189484 A1 | 10/2003 | Rust et al. |
| 2004/0006445 A1 | 1/2004 | Paek |
| 2005/0099269 A1 | 5/2005 | Diorio et al. |
| 2006/0097847 A1 | 5/2006 | Bervoets et al. |
| 2006/0097874 A1 | 5/2006 | Salesky et al. |
| 2006/0103536 A1 | 5/2006 | Kwak et al. |
| 2006/0176216 A1 | 8/2006 | Hipskind |
| 2007/0076528 A1 | 4/2007 | Kirby |
| 2007/0182567 A1 | 8/2007 | Stewart et al. |
| 2007/0252770 A1 | 11/2007 | Kai et al. |
| 2007/0262871 A1 | 11/2007 | Yamagajo et al. |
| 2007/0272011 A1 | 11/2007 | Chapa, Jr. et al. |
| 2008/0018479 A1* | 1/2008 | Hashimoto et al. ........ 340/572.8 |
| 2008/0021676 A1 | 1/2008 | Vock et al. |
| 2008/0111695 A1* | 5/2008 | Yamagajo et al. ......... 340/572.7 |
| 2008/0143620 A1 | 6/2008 | Khatri |
| 2008/0246615 A1 | 10/2008 | Duron et al. |
| 2008/0246616 A1 | 10/2008 | Sakama et al. |
| 2008/0284654 A1 | 11/2008 | Burnside et al. |
| 2008/0316032 A1 | 12/2008 | Kia |
| 2009/0015377 A1 | 1/2009 | Fogg et al. |
| 2009/0184806 A1 | 7/2009 | Kia |
| 2009/0231198 A1 | 9/2009 | Walsh et al. |
| 2010/0019897 A1 | 1/2010 | Stewart et al. |
| 2010/0051701 A1* | 3/2010 | Ogata et al. .................. 235/492 |
| 2010/0088023 A1 | 4/2010 | Werner |
| 2010/0295943 A1 | 11/2010 | Cha et al. |
| 2010/0302910 A1 | 12/2010 | Howell |
| 2012/0115557 A1 | 5/2012 | Kia |

FOREIGN PATENT DOCUMENTS

| | | |
|---|---|---|
| JP | 4394600 A | 10/2009 |
| JP | 2010-088886 A | 4/2010 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |

OTHER PUBLICATIONS

PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—Best Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Annex 1: Utilization of the Dag Badger System; Pygma Lyon (DAG), Jul. 19, 2004.
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 20, 2011.
PCT Search Report, PCT US 2011-060570, Sep. 6, 2011.

* cited by examiner

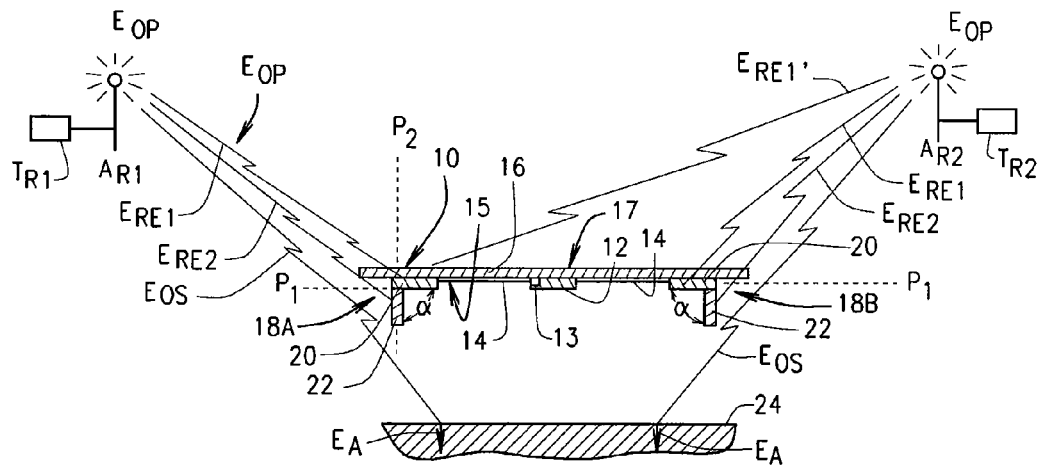
F I G. 1
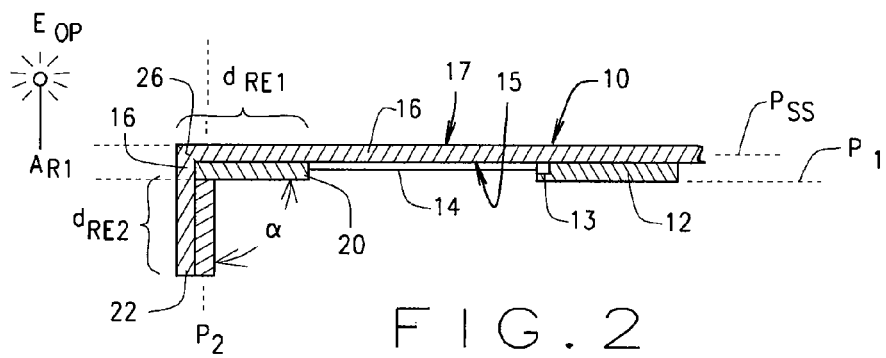
F I G. 2
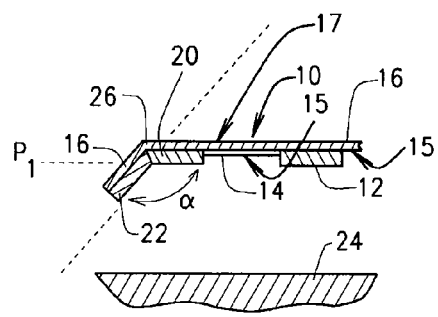
F I G. 3A
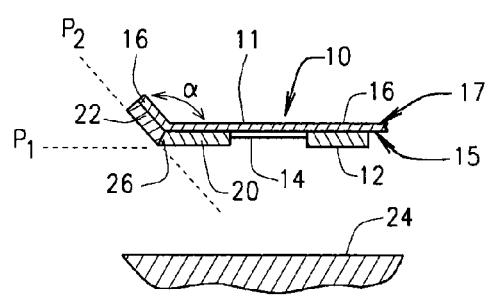
F I G. 3B

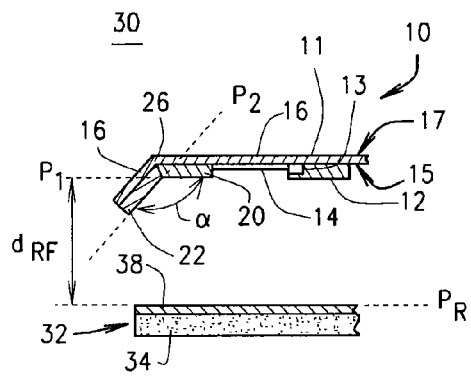
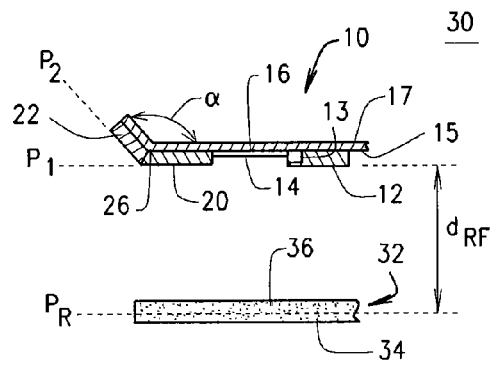
FIG. 6A   FIG. 6B
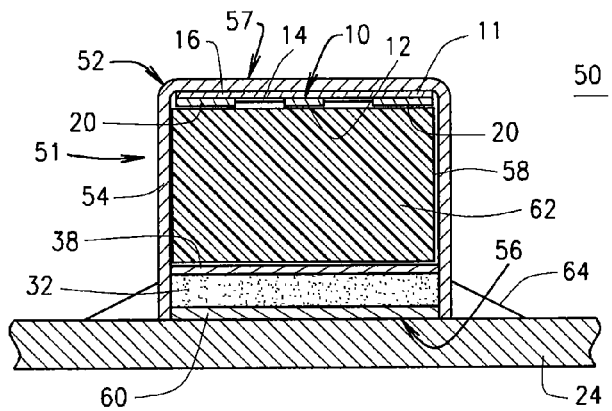
FIG. 7A
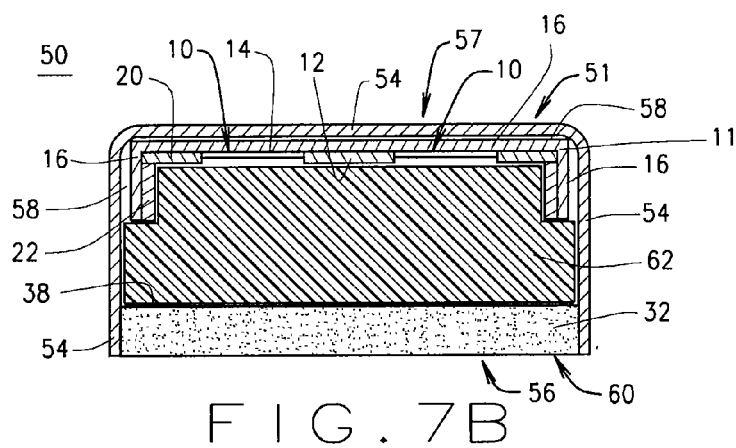
FIG. 7B

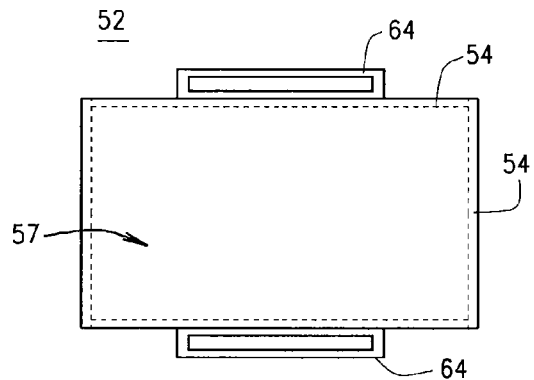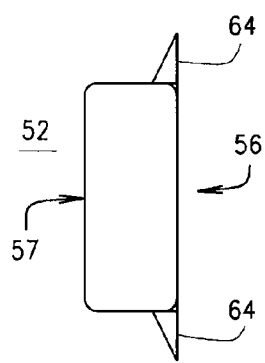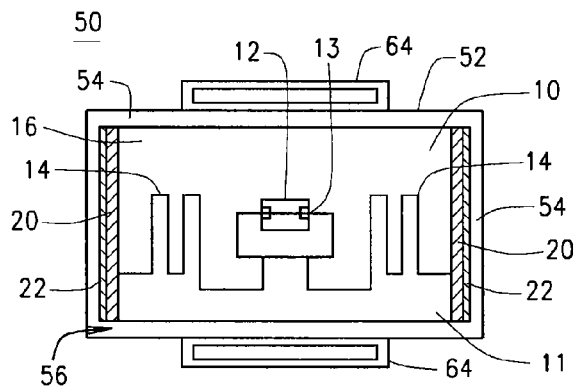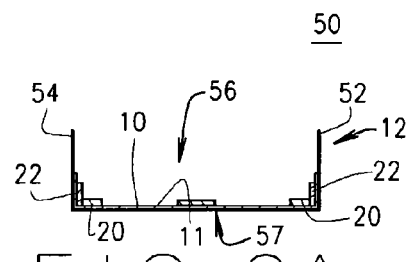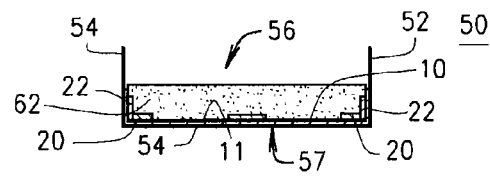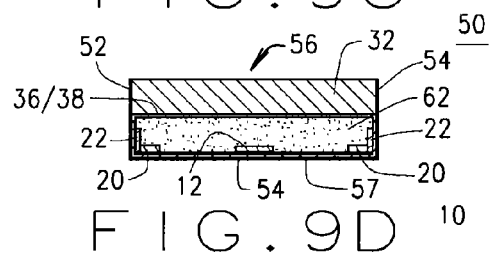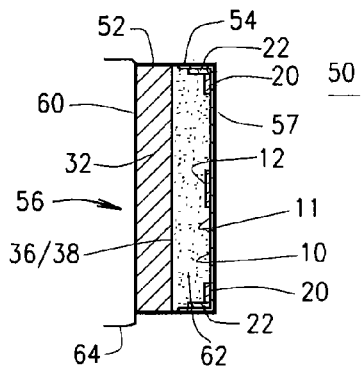

HARSH OPERATING ENVIRONMENT RFID TAG ASSEMBLIES AND METHODS OF MANUFACTURING THEREOF

CROSS-REFERENCE TO RELATED APPLICATIONS

This application is a Continuation of International Application No. PCT/US10/22559, filed Jan. 29, 2010 and entitled HARSH OPERATING ENVIRONMENT RFID TAG ASSEMBLIES AND METHODS.

This application has two sibling applications that claim the benefit of the same PCT application PCT/US10/22559. The first is U.S. National Stage application Ser. No. 13/129,771 that was filed on May 17, 2011 and is entitled EXTENDED RANGE RFID TAG ASSEMBLIES AND METHODS OF OPERATION. The second is a different U.S. Continuation patent application Ser. No. 13/110,586, entitled SPACED APART EXTENDED RANGE RFID TAG ASSEMBLIES AND METHODS OF OPERATION, as filed the same day as this application.

The disclosures of the above applications are incorporated herein by reference.

FIELD

The present disclosure relates to radio frequency identification ("RFID") tags, and more specifically, to assemblies and methods for RFID tags for use in a harsh operating environment.

BACKGROUND

The statements in this section merely provide background information related to the present disclosure and may not constitute prior art.

Typical RFID tags are not designed for use under harsh conditions. They are unsuitable for use in harsh conditions because of numerous factors including, for example, limited tag read ranges when used in harsh environmental conditions, the lack of protective design for the tag which increases the potential for damage due to harsh conditions, and a reduced ability to communicate with a tag reader when the tag is mounted near a radio frequency (RF) absorbing medium, such as the human body.

For example, contamination by water or other foreign materials, such as dirt or mud, that comes in contact with or in very close proximity to an RFID tag can adversely impact the operational characteristics. These can negatively impact the strength of the energy received by the RFID tag, which in turn negatively impacts the available power at the tag. Physical shock or jolts can also damage an RFID tag that can negatively impact the communicative ability of the RFID tag. By way of example, RFID tags, such as a passive RFID tag, are increasingly used for timing in many types of participants in racing events. However, many events such as adventure races, motocross, mountain biking, swimming, or triathlons, to name just a few, present a harsh environment that negatively affect the survivability and operation of the RFID tag for use in timing a participant.

Additionally, when an RFID tag is placed near a medium that absorbs RF energy, the operational ability and/or operating range of the RFID tag can be impacted. In fact, when an RFID tag is placed proximate to a human body or on or near a vehicle such as a mountain bike, RF absorption can significantly limit the operation of the RFID tag.

SUMMARY

The inventor hereof has identified the need and advantages of providing an assembly for an RFID tag having an extended tag operating range that functions well when positioned in close proximity to a structure that absorbs RF energy and/or that is configured to operate in a variety of operating environments including those that may be harsh. The inventor hereof has succeeded at designing assemblies and methods for operating an RFID tag that is capable of use in such operating environments including placement on a runner or vehicle during a race, by way of example.

According to still another aspect, a radio frequency identification (RFID) tag assembly including an RFID semiconductor chip having an antenna interface mounted on a mounting surface of a mounting substrate and having a predetermined operating frequency. A conductor is electrically coupled to the antenna interface of the RFID semiconductor chip and is formed on the mounting surface of the mounting substrate. An antenna is electrically coupled to the conductor and has a first radiating element lying in a first plane and a second radiating element lying in a second plane. The second plane being at an angle relative to the first plane. The assembly includes an enclosure having a body defining a cavity with a closed end and an opening. The cavity is dimensioned for receiving the mounting substrate with the RFID semiconductor chip, the conductor, and the first and second radiating elements. The mounting substrate is positioned proximate to the closed end of the cavity. The assembly further includes a seal for closing the opening and sealing the cavity.

According to another aspect, a radio frequency identification (RFID) tag assembly includes means for processing received radio frequency identification requests and generating responses to such requests and means for receiving and transmitting radio frequency energy in a first plane at a predetermined operating frequency between the means for processing and a remote transceiver. The assembly also includes means for receiving and transmitting radio frequency energy in a second plane at a predetermined operating frequency between the means for processing and a remote transceiver, the second plane being at an angle relative to the first plane. The assembly further includes an enclosure having a body defining a cavity with a closed end and an opening. The cavity is dimensioned to receive and enclose the means for processing and means for receiving and transmitting in a first plane and means for receiving and transmitting in a second plane. The assembly also includes means for closing and sealing the cavity of the enclosure including the means for processing and means for receiving and transmitting in a first plane and means for receiving and transmitting in a second plane.

According to another aspect, a method of manufacturing an RFID tag assembly for use in a harsh operating environment includes structuring an antenna electrically coupled to an RFID semiconductor chip having an antenna interface with a conductor. The RFID semiconductor chip operates at a predetermined operating frequency. The structuring includes forming the antenna to have a first radiating element lying in a first plane and a second radiating element lying in a second plane at an angle relative to the first plane. The method includes forming an enclosure having a body defining a cavity with a closed end and an opening. The body is formed from a material that does not conduct or absorb a substantial amount of energy at the predetermined operating frequency. The cavity is dimensioned for receiving and enclosing the RFID semiconductor chip, conductor and structured antenna positioned proximate to the closed end of the cavity. The method also includes mounting the RFID semiconductor chip, conductor and first and second radiating elements of the antenna within the cavity proximate to the closed end of the cavity and closing the opening of the cavity containing the RFID semiconductor chip, conductor and antenna. The closing includes sealing the opening.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 1 is a side cross-sectional view of a radio frequency identification (RFID) tag assembly having a two-radiating element multi-plane antenna in relationship to an operating surface according to one exemplary embodiment.

FIG. 2 is a close up side cross-sectional view of an RFID tag assembly having a two-radiating element multi-plane antenna according to one exemplary embodiment.

FIGS. 3A and 3B are close up side cross-sectional views of two RFID tag assemblies each having a two-radiating element multi-plane antenna in relationship to an operating surface according to additional exemplary embodiments.

FIGS. 6A and 6B are close up side cross-sectional views of two RFID tag assemblies each having a two-radiating element multi-plane antenna and two types of reflectors according to additional exemplary embodiments.

FIGS. 7A and 7B are an end cross-sectional view and a side cross-sectional view of an RFID tag assembly, respectively, each having an enclosure for mounting according to one exemplary embodiment.

FIGS. 8A and 8B are a top view and an end, respectively, of an enclosure suitable for use in an RFID tag assembly according to one exemplary embodiment.

FIGS. 9A to 9E are various views illustrating a method of assembling an RFID tag assembly according to one exemplary embodiment.

It should be understood that throughout the drawings, corresponding reference numerals indicate like or corresponding parts and features.

DETAILED DESCRIPTION

Figure 4:
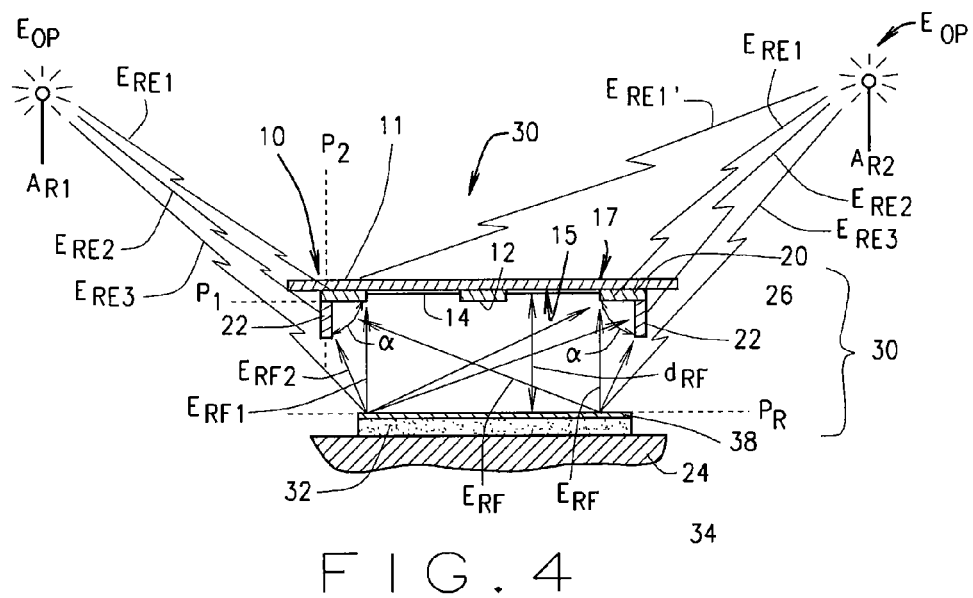
FIG. 4 is a side cross-sectional view of an RFID tag assembly having a two-radiating element multi-plane antenna and a reflector in relationship to an operating surface according to yet another exemplary embodiment.

The following description is merely exemplary in nature and is not intended to limit the present disclosure or the disclosure's applications or uses. For example, the present disclosure generally describes various embodiments of an RFID assembly and methods that are suitable as a "timing chip" for use in timing of participants involved in a sporting event. However, such application and embodiments are only exemplary in nature, and it should be clear to one of skill in the art after having reviewed the present disclosure, that the RFID assemblies and methods as described herein can be used for any number of other RFID applications, including those that require tracking position versus time or the operation of the RFID assembly in a harsh operating environment.

Before turning to the figures and the various exemplary embodiments illustrated therein, a detailed overview of various embodiments and aspects is provided for purposes of breadth of scope, context, clarity, and completeness.

In one embodiment, a radio frequency identification (RFID) tag assembly including an RFID semiconductor chip, a conductor and an antenna. The RFID semiconductor chip as addressed herein can be any radio frequency identification chip whether passive or active. The RFID semiconductors typically have antenna interface, a microprocessor with stored or embedded computer implementable and executable instructions, a memory for stored user data, and one or more communication interfaces that operate at one or more predetermined operating frequency in receiving and generating radio frequency energy. Any suitable RFID tag can also be used within the scope of the present disclosure. By way of example, the ALN-9662 Squiggle-® SH (a registered trademark of Alien Technologies) is one RFIG tag that is suited for use in accordance with the present disclosure. Of course other RFID tags are also considered within the scope of the present disclosure.

These RFID semiconductors as implemented as RFID tags can include any form of communication interface or antenna interface suitable for operating at the desired or predefined or predetermined operating frequency and energy level. Such predetermined operating frequency can be any frequency suitable for such a desired application, and in one embodiment, by way of example and not intending to be limited thereto, a UHF spectrum ranging from about 860 to about 928 MHz, and in some embodiments the predetermined operating frequency is in a range about 915 MHz. In some embodiments, the predetermined operating frequency may be a range of operating frequencies wherein the radio frequency energy utilizes two or more operating frequencies for specific functions or applications, such as, by way of example, one for receiving at the RFID tag assembly and a second different one for generating and transmitting at the RFID tag. There can be a different one for an initial energy pulse or a wake up powering energy communication, a second one for a request or instruction message, and yet another one for an acknowledgement and/or reply. The discussion herein with regard to such radio frequency energy includes all such forms of energy. The communication interface is adapted based on predetermined RFID specifications and protocols, any of which are generally suitable for applicability to the described embodiments herein, and this disclosure is not limited to any particular such RFID communication messaging or protocol or functionality.

For example, a remote RFID transceiver associated with a "RFID Reader" includes a transmitter and receiver (also known as a base station and one or more antennas, collectively referred herein as an RFID base station transceiver or in short an RFID transceiver. Such remote RFID transceiver communicates by generating and receiving radio frequency energy at the predetermined operating frequency with various mated RFID semiconductor chips for requesting and receiving data stored in a memory of an RFID semiconductor chip. In some embodiments, the RFID transceiver may also provide an initial radio frequency energy pulse and energy transfer over the predetermined operating frequency. Such radio frequency energy is received by the RFID semiconductor chip and is stored by the RFID semiconductor chip for powering an embedded transceiver, microprocessor, memory, and communication interface, including the antenna interface. Such is typical in a passive RFID semiconductor embodiment. As described herein, the radio frequency energy includes, and is not limited to, all forms of messaging, signaling, and communications and other methods of radio frequency energy transfer.

The components of the various described RFID assemblies can be implemented as discrete components, or in various groupings, or as an RFID tag that includes two or more of the components mounted on a mounting surface of a mounting substrate. For example, the mounting substrate can be a nonconductive plastic base, for example a polyester (PET) film (for example, Mylar® that is a registered trademark of DuPont Tejjin Films). However, other suitable materials for the mounting substrate are also possible and considered within the scope of the present disclosure.

The conductor of the RFID assembly is electrically coupled to the antenna interface of the RFID semiconductor chip. The conductor can be any form of electrically conducting material and is often a conductor formed by an integrated circuit fabrication technology resulting in a foil or thin layer conductor on the mounting surface of the mounting substrate.

The antenna is electrically coupled to the conductor. The antenna can be any suitable antenna such as, but not limited to, a dipole antenna. The antenna has a first radiating element lying in a first plane and a second radiating element lying in a second plane that is at an angle relative to the first plane. It should be noted that when the antenna is a dipole antenna, the first and second radiating elements are not to be considered to be the two opposite direction elements of the dipole antenna. Rather one or both of the opposing elements of the dipole antenna can be configured or equipped to having the first and second angled radiating elements.

The antenna can be a discrete component antenna or can be an antenna as formed by integrated circuit fabrication technology such as a foil antenna having foil radiating elements formed on a mounting surface of a mounting substrate, which can be the same mounting substrate as addressed above. For example, in one embodiment the radiating elements can be formed from copper foil. In such embodiments, the first and second radiating elements of the antenna are formed on the mounting surface of the mounting substrate as foil radiating elements. An end portion of the mounting substrate along with an end portion of the first radiating element can be bent or deformed to a position that is angled from the first plane containing the remaining portion of the first radiating element. In this manner, the second radiating element is differentiated from the first radiating element by an angled deformation formed in the mounting substrate and the foil antenna. Alternatively, the first radiating element and the second radiating element can be formed by any suitable means including, but not limited to, pre-molding or pre-casting the second radiating element and the first radiating element.

As described above, the second radiating element lies in a second and different plane than the first radiating element. As such, the antenna is described herein as a bi-planar antenna. The angle between the two planes, radiating element plane 1 and radiating element plane 2 can be any angle, but includes in some embodiments, an angle of between 45 degrees and 135 degrees, with one particular embodiment being a perpendicular or 90 degree orientation. Additionally, it should also be noted that the orientation between the two may be either from either side of radiating element plane 1.

Each of the radiating elements of the antenna can have any length. However, in one embodiment where the predetermined operating frequency is in the UHF frequency range of about 902 to about 928 megahertz, the first radiating element can have a length less than about ¼ of a wavelength of the predetermined operating frequency and the second radiating element can have a length less than about ¼ of the wavelength of the predetermined operating frequency. However, other lengths and dimensions of the first and second radiating elements are also considered within the scope of the present disclosure.

In some embodiments, the RFID assembly as described above can also include a reflector having a substantially planar reflecting plane spaced apart from and substantially parallel to the first plane of the first reflecting element. The reflector can be composed of any reflecting material or components for reflecting some or all of the energy received at the predetermined operating frequency of the RFID assembly. The reflector can be positioned apart from the first plane with the reflecting plane positioned towards the first plane on a side of the first plane of the angled second radiating element or on the opposing side. The reflector can be positioned at any distance from the first plane of the first radiating element, or the second radiating element. However, in some embodiments, the reflector is positioned apart from the first radiating element or at least the first plane of the first radiating element with the reflective plane being a distance of about ¼ of a wavelength of the predetermined operating frequency. In other embodiments, the distance can be greater than about ¼ of the wavelength and in some embodiments can be multiples of ¼ of the wavelength.

The reflector can be selected and adapted to not only reflect some or all of the radio frequency energy received at the predetermined operating frequency, but also such that the reflector is capacitively coupled to the antenna or at least to one of the radiating elements thereof at the predetermined operating frequency. The capacitive coupling of the reflector with the spaced apart antenna can provide one or more benefits to the RFID assembly: act as an amplifier of the received radio frequency energy, make the antenna appear and operate as having a larger electrical area, increasingly the effective length of the antenna beyond the physical length, increase the gain of the antenna, improve the efficiency of the antenna, modify the impedance of the antenna, and/or tune or modify the radiation pattern of the antenna.

The reflector can be formed from any type of suitable material or having a composition of suitable matter. In one embodiment, the reflector is a flat metallic surface that may be ungrounded. In another embodiment, the reflector has a body defining the reflective plane either on the surface of the body, or within the surface of the body. For example, the body of the reflector can be composed of a composite material having a dielectric constant responsive to the predetermined operating frequency. In other embodiments, a composite material for the reflector can include a reflective substance such as metal chips or similar radio frequency reflecting material. The composite material can be, by way of example, a potting compound. In one embodiment, the potting compound of a reflector consists of a 30/70% mix of Loctite® 3173/3183 (Loctite is a registered trademark of Henkel AG & Co. KGaA) and has a dielectric constant of about 5.92. Other suitable components or compositions can be used to form the reflector, but in some embodiments it may be desired that the dielectric constant of the resulting compound has a dielectric constant in the desired range based on the predetermined operating frequency. But also the composition may be selected or adjusted such that the composition provides a desired rigidity in its cured form.

In one embodiment, the reflector can consist of a potting compound having a metal flake suspended therein for enhancing the potting compound's ability to reflect RF energy. The potting compound can be configured to capacitively couple RF energy to the first and second angled radiating elements of the antenna. The capacitive coupling can provide for an increase in the effective antenna length that is greater than the physical length of the antenna. The amount of capacitive coupling can be varied by controlling the dielectric constant of the potting compound and can be used to provide proper tuning of the antenna for the desired operational frequency range. The dielectric constant of the potting compound can vary from about 4.68 to about 5.92, depending on the dimensions of the enclosure, the desired frequency range of operation and the amount of capacitive coupling desired. The potting compound used for the reflector can also have sufficient rigidity to protect the RFID assembly components within the enclosure from both physical and environmental damage.

In some embodiments, a composite reflector such as one composed from a potting compound, can serve functions for the RFID assembly in addition to the reflecting of the radio energy at the predetermined operating frequency. As will be described below, a reflector made from a potting compound can be positioned relative to the RFID tag and antenna in a mouth or cavity of a mounting configuration such that reflector not only acts as a reflector for the radio frequency energy to and from the antenna having the two angled radiating elements, but also to close and seal the mouth or cavity in which it is positioned or formed.

In some embodiments, a spacer can be included that is positioned between the first plane of the first radiating element and the reflector for maintaining the spaced apart position of the reflector from the first radiating element. Such a spacer can be composed of a material that does not conduct or absorb a substantial amount of energy at the predetermined operating frequency. In some embodiments, the spacer can be a fixture or mounting of an enclosure of the RFID assembly that maintains the reflector distance. In other embodiments, the spacer can be composed of a foam material and can be attached to the second planar surface of the mounting substrate, or can be attached to a surface of the reflector. Generally, as with any suitable spacer material, the foam material of such a spacer should be composed of a material that is non-conducting and non-absorbing of a substantial amount of energy at the predetermined operating frequency.

The RFID assembly can also include an enclosure for one or more other components. A suitable enclosure can include a body defining a cavity with a closed end and an opening. The cavity can be dimensioned for receiving the mounting substrate, the RFID semiconductor chip, the conductor, and the antenna with the first and second radiating elements. In some embodiments, the mounting substrate can be positioned proximate to the closed end of the cavity, but any suitable position is possible and considered to be within the scope of the present disclosure.

The size and composition of the enclosure can be optimized for the particular RFID semiconductor chip, predetermined operating frequency, and antenna, and/or reflector and spacer, where provided. The enclosure can also be dimensioned for suitable operational considerations including minimizing the overall size and potential drag or exposure of the RFID assembly when attached to an operating surface such as a participant or vehicle in a timed event. The enclosure can be formed from an ABS plastic or any plastic or composite or other material which provides sufficient rigidity and minimizes absorption of RF energy. Some plastics contain compounds add strength or color to the plastic, but can negatively affect the RF energy strength or the RF pattern received and transmitted by the RFID tag placed inside.

In addition, the enclosure can provide rigidity to minimize the chance of damage to the internal components when the RFID assembly is used or operated in harsh conditions. The thickness and dimensions of the walls of the enclosure can also be optimized to ensure maximum RF energy strength at the RFID tag. The enclosure can include mounting flanges or fixtures that protrude from one or more sides of the enclosure and serve as external operating attachment points for a strap or other device which can be used to attach the RFID assembly to an operating surface such as body of a user or a surface of a vehicle or other user related device. These mounting fixtures can aid in the mounting of the enclosure to an operating surface and, where provided, the reflector can be positioned between the operating surface and the mounting substrate with the reflective plane of the reflector being positioned in a direction towards the mounting substrate and away from the operating surface. In this embodiment, the reflector aids in reflecting radio energy that would otherwise be absorbed by the body containing the mounting surface.

By way of one exemplary embodiment, a radio frequency identification (RFID) tag assembly includes an RFID semiconductor chip having an antenna interface mounted on a mounting surface of a mounting substrate and has a predetermined operating frequency. The assembly includes a conductor electrically coupled to the antenna interface of the RFID semiconductor chip that is mounted on the mounting surface. The assembly also includes an antenna that is electrically coupled to the conductor. The antenna has a first radiating element lying in a first plane and a second radiating element lying in a second plane. The second plane is at an angle relative to the first plane. The first radiating element has length less than about ¼ of a wavelength of the predetermined operating frequency and the second radiating element has a length less than about ¼ of the wavelength of the predetermined operating frequency.

In the alternative, another exemplary embodiment can include a radio frequency identification (RFID) tag assembly having an RFID semiconductor chip with an antenna interface mounted on a mounting surface of a mounting substrate and having a predetermined operating frequency. A conductor is electrically coupled to the antenna interface of the RFID semiconductor chip and can be formed on the mounting surface of the mounting substrate. An antenna is electrically coupled to the conductor and has a first radiating element lying in a first plane and second radiating element lying in a second plane, the second plane being at an angle relative to the first plane. The assembly includes an enclosure having a body defining a cavity with a closed end and an opening. The cavity is dimensioned for receiving the mounting substrate with the RFID semiconductor chip, the conductor, and the first and second radiating elements. The mounting substrate is positioned proximate to the closed end of the cavity. The assembly further includes a seal for closing the opening and sealing the cavity.

In another exemplary embodiment, a method of operating a radio frequency identification (RFID) tag assembly including receiving at a first radiating element in a first plane of an antenna coupled to an RFID semiconductor chip a first portion of radio frequency energy transmitted from an antenna associated with a base station transceiver positioned remote from the RFID tag assembly. The radio frequency energy being at a predetermined operating frequency. The method also including receiving at a second radiating element in a second plane of the antenna coupled to the RFID semiconductor chip a second portion of the radio frequency energy transmitted from the base station transceiver antenna. The second plane is at an angle to the first plane. The second radiating element is electrically coupled to the first radiating element. The second portion of the radio frequency energy is received at the predetermined operating frequency. The method also including processing the received first and second portions of the radio frequency energy by the RFID semiconductor chip and generating a reply radio frequency energy at the RFID semiconductor chip at a predetermined reply operating frequency. The generating is in response to the processing and in response to the first and second received radio frequency energy portions. The method further includes radiating the reply radio frequency energy by the first and second radiating elements of the antenna coupled to the RFID semiconductor chip.

This embodiment of method of operation can also include, as described above, reflecting at a reflector a third portion of the radio frequency energy at the predetermined operating frequency as transmitted from the based station transceiver antenna. This can be in addition to any of the first and second portions as can be received directly by the first and second radiating elements without any reflecting by the reflector. The reflector can have a substantially planar reflecting plane spaced apart from and substantially parallel to at least one of the first and second planes of the antenna. The method can also include receiving at the first and second radiating elements the third portion of the radio frequency energy and processing the received third portion of the radio frequency energy by the RFID semiconductor chip. The reflector can also reflect a portion of the generated or radiated predetermined reply energy as received from one or both of the first and second radiating elements. As noted above, the predetermined reply operating frequency can be the same as or different than the predetermined operating frequency.

Referring now to the exemplary embodiments as provided by the figures, a first exemplary embodiment of an RFID tag assembly 10 is shown FIG. 1. An RFID semiconductor chip 12 having an antenna interface 13 is coupled to conductor 14. A mounting substrate 16 having a first surface shown as a mounting surface 15 and an opposing surface 17. An antenna 18 is coupled to the conductor 14. It should be noted that the RFID tag assembly 10 having only the RFID semiconductor chip 12, conductor 14 and antenna 18 packaged together is often referred to simply as an RFID tag 11. As shown in FIG. 1, this exemplary embodiment shows the antenna 18 as being a bipolar antenna having two opposing portions 18A and 18B. Each antenna portion 18A and 18B has a first radiating element 20 lying in a first plane $P_1$ and a second radiating element 22 lying in a second plane $P_2$. An angle $\alpha$ is defined as the angle between the first plane $P_1$ and the second plane $P_2$. As shown in this example, angle $\alpha$ is about 90 degrees and therefore first plane $P_1$ is perpendicular to second plane $P_2$ and the second radiating element 22 is perpendicular to the first radiating element 20. In this embodiment, the second radiating element 22 is oriented at its angle $\alpha$ to be in the direction of an operating surface 24 that is proximate to the RFID tag assembly 10. As shown, the RFID semiconductor chip 12, the conductors 14 and both of the first radiating elements 20 of each of the poles of the dipole antenna 18 are mounted on the mounting surface 15 of the mounting substrate 16. In this embodiment, the second radiating elements 22 are shown to extend from the first radiating elements 20 at the angle $\alpha$. The first plane $P_1$ is either equivalent to a plane as defined by the mounting surface 15 or parallel thereto. Such first plane $P_1$ can also be referred to as a first ground plane $P_1$ and second plane $P_2$ can also be referenced to as a second ground plane P2 as would be understood by one of skill in the art after reviewing the present disclosure.

In operation, the RFID tag assembly 10 is positioned in range of one or more RFID transceivers $T_R$, each with one or more transceiver antenna $A_R$. FIG. 1 illustrates two RFID transceivers $T_{R1}$ and $T_{R2}$ each with a single transceiver antenna $A_{R1}$ and $A_{R2}$, respectively. Each antenna $A_R$ transmits and receives radio frequency energy E to and from the RFID tag assembly 10 at one or more predefined operating frequencies $E_{OP}$. For the sake of illustration and discussion, specific energy transmissions are shown as E sub X wherein the X denotes an exemplary propagation of energy between two components solely for the sale of discussion and presentation. One skilled in the art should understand that this is only for discussion purposes and is not intended to be limiting or to describe a physical or logical point-to-point relationship. Energy $E_{RE1}$ is shown as energy at the predefined operating frequency propagating between each of antennas $A_{R1}$ and $A_{R2}$ and the first radiating element 20, e.g., as such the nomenclature wherein X=RE1 for first radiating element. Energy $E_{RE2}$ is similar representative of propagating energy between antennas $A_{R1}$ and $A_{R2}$ and the second radiating element 22. Energy ERE1' (prime) is shown as propagating between antenna $A_{R1}$ and the first radiating element 20 of the far pole of the bipolar antenna 18, but is only shown for the sake of completeness and should be understood by one skilled in the art without further explanation. As illustrated here, each of the two angled radiating elements receives and transmits energy $E_{RE1}$ that may differ from the energy $E_{RE2}$ based on the orientation of each radiating element 20, 22 with regard to the transceiver antenna $A_{R1}$ or $A_{R2}$. As shown, the more vertical the antenna $A_{R1}$ or $A_{R2}$ is with regard to plane $P_1$, the more likely that the first radiating element 20 will propagate more energy $E_{OP}$ with the antenna $A_R$ than the second radiating element 22. Also, the more horizontal the antenna $A_R$ is with regard to plane $P_1$, the more energy $E_{OP}$ will be propagated with the second radiating element 22 and the less will be propagated by the first radiating element 20. Of course, as described above, the angle $\alpha$ can be something other than 90 degrees and therefore can be selected based on the expected orientation of the RFID tag assembly 10 with the transceiver antenna $A_R$ with which it is expected to operate in an operating environment.

Also as shown in FIG. 1, the operating surface 24 and/or operating body having the operating surface 24 will receive a portion of the energy $E_{OP}$ propagated by the transceiver antenna $A_R$, as well as that propagated by the antenna 18 of the RFID tag assembly 10. However, such operating surface 24 often absorbs energy $E_A$ into the operating surface 24 and therefore can act as a drain on energy $E_{OP}$, or at least is neutral thereto.

FIG. 2 illustrates another embodiment of an RFID tag assembly 10 that is similar to that illustrated in FIG. 1 but with some minor differences. In this embodiment, the RFID tag 11 has the mounting substrate 16 is formed continuously in relation to both the first and second radiating elements 20, 22. As shown, the mounting substrate 16 can define a substrate plane $P_{SS}$. In other words, the second radiating element 22 can also be mounted to the mounting surface 15 of the mounting substrate 16. In this embodiment, the mounting substrate 16 is deformed at angled deformation 26 for define angle α. As shown in FIG. 2, the first radiating element 20 has a length along first plane $P_1$ of $d_{RE1}$ and the second radiating element 22 has a length along second plane $P_2$ of $d_{12}$. In one embodiment hereof, the lengths $d_{RE1}$ and $d_{RE2}$ can be different or they can be the same. Such lengths can also be defined in relation to a wavelength of the energy $E_{OP}$ as described above.

FIG. 3A illustrates an embodiment of an RFID tag assembly 10 having the RFID tag 11 formed with the angle α between the second plane $P_2$ and the first plane $P_1$ being greater than 90 degrees in the direction or orientation of the operating surface 24 and therefore typically in the opposing direction of the placement of the transceiver antenna AR. FIG. 3B illustrates an embodiment of an RFID tag assembly 10 having the RFID tag 11 formed with the angle α between the second plane $P_2$ and the first plane P1 being greater than 90 degrees but in the direction or orientation away from the operating surface 24 and therefore typically in a direction towards the typical placement of the transceiver antenna $A_R$. In both these embodiments, the mounting substrate 16 is shown as extending proximate to both the first and second radiating elements 20, 22 wherein the deformation 26 defines the angle α and the differentiating point between the first radiating element 20 in the first plane $P_1$ and the second radiating element 22 in the second plane $P_2$.

FIG. 4 illustrates another exemplary embodiment of an RFID tag assembly 30 having a two-radiating element angled multi-plane antenna 18 and a reflector 32 positioned between the RFID tag 11 and the operating surface 24. In this exemplary embodiment, the reflector 32 has body 34 that is composed of a composite material with a reflective surface 38 defining a reflective plane $P_R$. The reflective surface 38 is selected for optimizing the reflection of energy $E_{OP}$ at the predetermined operating frequency. The reflector 32 is positioned relative to the RFID tag 11 and the operating surface 24 at a distance $D_{RF}$ from the RFID tag 11 or at least the first plane $P_1$ of the first radiating element $R_{E1}$. The distance $D_{RF}$ is selected as a function of the wavelength of the predetermined operating frequency as described above. For example, in one exemplary embodiment, the distance $D_{RF}$ can be between about 6 millimeters (about 0.250 inches) and about 7 millimeters (about 0.275 inches).

The operation of RFID tag assembly 30 is similar to that described above with regard to FIGS. 1-3, except with regard to the reflected energy $E_{RF}$ that is received from either the transceiver antenna $A_{R1}$, $A_{R2}$ or the first or second radiating elements 20, 22. The reflector 32 can operate to prevent absorption of the operating energy $E_{OP}$ by the operating surface 24 in the area proximate to the RFID tag assembly 30 and/or to reflect a portion of the $E_{OP}$ as reflected energy $E_{RF}$ that propagates between the transceiver antenna $A_R$ and one or both of the first and second reflecting elements 20, 22.

Figure 5:
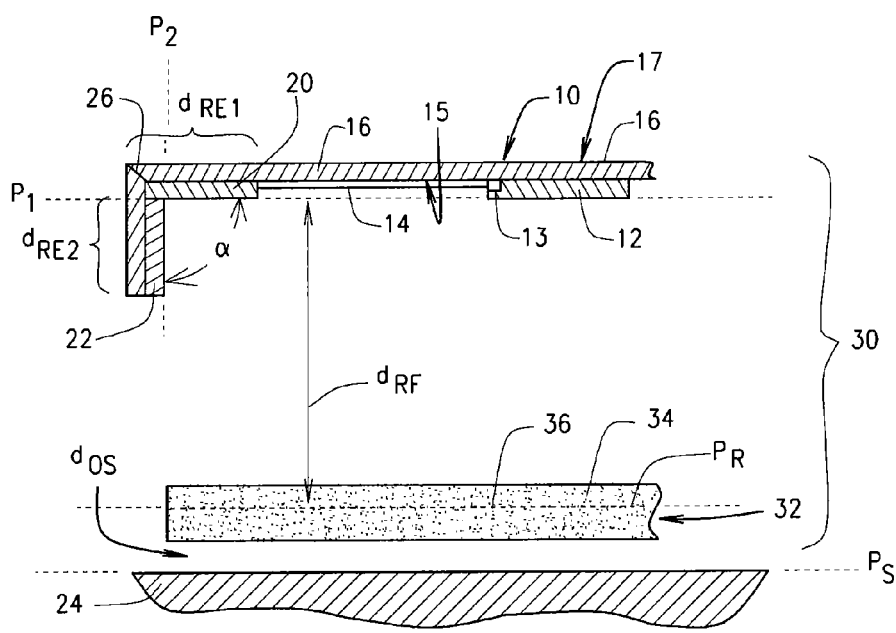
FIG. 5 is a close up side cross-sectional view of an RFID tag assembly having a two-radiating element multi-plane antenna and a composite reflector in relationship to an operating surface according to yet another exemplary embodiment.

FIG. 5 illustrates another embodiment of the RFID tag assembly 30. In this embodiment, the RFID tag assembly 30 has a reflector 32 that has the body 34 composed of a composite material containing reflective material 36 such as metal flakes, by way of example. This differs also from the embodiment of FIG. 4 in that the reflector 32 does not include a reflective surface 38. As the composite material of the body 34 of the reflector 32 with the embedded reflective material 36 provides the reflective characteristics of the reflector 32, the reflective plane $P_{RF}$ is effectively below an exposed surface of the reflector and lies within the body 34. As such, the distance $D_{RF}$ should be adjusted to optimize the positioning between the reflector 32 and first reflecting element 20 or at least the first plane $P_1$. FIG. 5 also illustrates that the reflector 32 may be positioned apart from the operating surface 24 and the plane of the operating surface $P_S$. The spaced apart position of the reflector 32 from the operating surface 24 results in a gap identified by distance $d_{OS}$.

FIGS. 6A and 6B reflect two alternative embodiments to the RFID tag assembly 30. FIG. 6A illustrates the relationship between and the orientation of the reflector 32 and the RFID tag 11 where the second radiating element 22 extends towards the reflector 32 but at an angle α that is greater than 90 degrees. As shown, the reflector 32 includes the reflecting surface 38 and is positioned at a distance $d_{RF}$ from the first plane $P_1$. FIG. 6B illustrates an exemplary embodiment wherein the reflector 32 is a composite reflector with reflecting elements 36 embedded therein. As shown, the RFID tag 11 has the second radiating element 22 extending away from reflector 32 at an angle α that is greater than 90 degrees in this exemplary embodiment.

FIGS. 7A and 7B illustrate an exemplary embodiment of an RFID tag assembly 50 wherein the RFID tag assembly 30 is enclosed in an enclosure 51. FIG. 7A is an end cross-sectional view and FIG. 7B is a side cross-sectional view. As shown, the enclosure 51 is defined by a body 52 having a plurality of walls 54 defining an opening 56, and a cavity 58. One of the walls 54 is an end wall 57 at an end of the cavity 58 opposing the opening 56. The opening 56 and the cavity 58 are dimensioned for receiving and holding an RFID tag 11 such as one or more RFID tag assemblies 10. As shown, the body 52 can also include one or more mounting fixtures 64 for mounting of the enclosure to an operating surface 24. FIGS. 8A and 8B are a top view and an end, respectively, of one suitable enclosure 51 for use in RFID tag assembly 50.

As shown in the exemplary embodiment of FIGS. 7A, 7B and 8A and 8B, the RFID tag assembly 50 can have the RFID tag 11, or tag assembly 10, 30, positioned within the cavity 58. As shown, the RFID tag 11 can be positioned proximate to the end wall 57. The RFID tag 11 can be mounted to the end wall 57 by an adhesive (not shown) or can be otherwise secured into place or place for biasing against the end wall 57 that can include a mounting material therebetween as required. A reflector 32 can be positioned at the distance $d_{RF}$ from the RFID tag 11 and in particular from the first plane $P_1$. A seal 60 is provided for closing the opening 56 and securing and sealing the RFID tag within the cavity 58. The seal 60 can provide a waterproof seal protecting the RFID tag 11. In some embodiments, the reflector 32 can be composed of a composite or other material that can act not only as a portion of the reflector 32 but also as the seal 60. For example, the reflector 32 can be composed of a potting material as described above. The potting material is placed in the opening 56 to form the reflector 32 and also provides the seal 60 once the potting material cures. Additionally, a reflective surface 38 can be included in some embodiments. Also, in some embodiments, a spacer 62 can be included for providing the continued spaced apart position of the RFID tag 11 from the reflector 32 and/or other the seal. The spacer 62 can be any spacer or made of any material as described above. Additionally, in some embodiments the spacer 62 can be configured as an integrally portion or fixture of the walls 54 as inside a portion of the cavity 58. The height of the spacer can be of any length, but in one embodiment is at least about 3 millimeters (about 0.125 inches).

In another embodiment, a method of manufacturing an RFID tag assembly for use in a harsh operating environment includes structuring an antenna electrically coupled to an RFID semiconductor chip having an antenna interface with a conductor. The RFID semiconductor chip operates at a predetermined operating frequency. The structuring includes forming the antenna to have a first radiating element lying in a first plane and a second radiating element lying in a second plane at an angle relative to the first plane. The method includes forming an enclosure having a body defining a cavity with a closed end and an opening. The body is formed from a material that does not conduct or absorb a substantial amount of energy at the predetermined operating frequency. The cavity is dimensioned for receiving and enclosing the RFID semiconductor chip, conductor and structured antenna positioned proximate to the closed end of the cavity. The method also includes mounting the RFID semiconductor chip, conductor and first and second radiating elements of the antenna within the cavity proximate to the closed end of the cavity and closing the opening of the cavity containing the RFID semiconductor chip, conductor and antenna. The closing includes sealing the opening.

In one embodiment, the method of manufacturing includes structuring the antenna by modifying an RFID tag assembly formed on a mounting substrate having the RFID semiconductor chip, conductor and a preformed planar foil antenna formed thereon. The preformed antenna lies in the first plane and has a length equal to or greater than about ½ of a wavelength of the predetermined operating frequency. The method includes cutting an end portion of the mounting surface and the preformed antenna formed thereon to form a reduced length antenna having a length of the antenna to less than about ½ of the wavelength of the predetermined operating frequency. An end of the reduced length antenna is deformed at the angle to form an angled deformation between the second radiating element defined at the end of the antenna and the first radiating element being a portion of the reduced length antenna that is not deformed. The first and second radiating elements are therefore formed to each having a length of less than about ¼ of the wavelength of the predetermined operating frequency. As noted above, this process can be repeated at each opposing element of a bipolar antenna wherein applicable. The other aspects of the manufacturing process of embodiments of the RFID assembly are inherent above in the description of the RFID assembly.

FIG. 9 (illustrated as FIGS. 9A-9E) provide a pictorial representation of one exemplary method of manufacturing an RFID tag assembly 50. As an initial step, while not shown, a pre-manufactured OEM RFID tag 11 having the RFID semiconductor ship 12, conductors 14 and bipolar antenna 18 formed on a mounting surface 15 of a mounting substrate 16 is modified. Each end of the mounting substrate 16 includes one of the poles of the bipolar antenna 18. The mounting substrate 16 as provided defines the first plane $P_1$. Each opposing end of the mounting substrate 16 and a portion of each pole of the bipolar antenna 18 are cut and shortened such that each remaining antenna length is less than about ½ of the wavelength of the predetermined operating frequency. Next, each shortened end of the mounting substrate 16 is deformed at a point so as to create the deformation point 26 and to form the separation between the first radiating element 20 in the first plane $P_1$ and the second radiating element 22 as well the second plane $P_2$ and the angle α therebetween. In some embodiments, the second radiating element 22 can be dimensioned to have a length of about 3 millimeters (0.125 inches) and the first radiating element 20 has a length of about 6 millimeters (0.25 inches). Of course other dimensions are also possible as described above. As such, an embodiment of the RFID tag assembly 10 is formed.

As shown in FIGS. 9A and 9B, the RFID tag assembly 10 is placed through opening 56 and against the end wall 57 of the cavity with the first exposed surface 17 of the mounting substrate 16 being in the direction of the end wall 57 and the mounted RFID tag 11 being in the direction of the opening 56. The enclosure 51 and its cavity 58 can be sized so that the RFID tag 11 remains at least 10 millimeters (0.39 inches) away from any wall 54 of the cavity 58. As shown in this example, each of the second radiating elements 22 is positioned proximate to a side wall 54 of the enclosure within the cavity 58 and in the direction or orientation of the opening 56. The first exposed surface 17 can be fixedly or selectively attached to the end wall 57 with an adhesive in some embodiments. In another embodiment, the second radiating element 22 can be secured to the side wall 54 of the cavity 58 using a non-conductive adhesive or similar fastener. FIG. 9B provides a top view of the RFID tag assembly 10 being positioned within the cavity 58 of enclosure 51.

By placing the first and second radiating elements 20, 22 at each end of the cavity 58 as shown in FIG. 9B, the RFID tag assembly 50 can function equally well in any orientation relative to antennas $A_R$ associated with the remote RFID transceiver $T_R$. An effective length of radiating elements 20 and 22 can be adjusted based on the wavelength of the predetermined operating frequency. The length $d_{RE1}$ of the first radiating element 20 and/or length of $d_{RE2}$ of the second radiating element 22 can be varied to accommodate operation in other frequency ranges.

Next, as shown in FIG. 9C, a spacer 62 is placed through the opening 56 and into the cavity 58 overlaying the placed RFID tag assembly 10. As described above, the spacer 62 can be configured and/or dimensioned to provide a predefined spacing either between a reflector 32 (where included), or in relation to an operating surface 24 on which the enclosure 51 is placed or mounted. In the embodiment of FIG. 9C, the cavity 58 is dimensioned so as to accept not only the spacer 62 but also a reflector 32. After the spacer 62 is inserted as in FIG. 9C, the reflector 32 can be placed in the opening 56 such as by placing an uncured potting material of body 34 on top of the spacer 62 proximate to the opening 56 and about to the end of the walls 54 defining the cavity 58 and the opening 56. This is shown in FIG. 9D. Also, in some embodiments, as in FIG. 9D, a reflective material 36 may be added to material of the body 34. In the alternative, a reflective surface 38 or component or structure providing the reflective surface 38 can be placed proximate to the spacer 62 prior to the placement of the reflector 32. The potting compound of the reflector 32 can provide a seal 60 to the opening 56 and the cavity 58. However, in other embodiments, an exterior seal 60 can be added after placement of the reflector 32 as shown in FIG. 9E for providing a desired seal and protection to the reflector 32 and to the RFID tag assembly 50.

In another embodiment, an RFID tag assembly for use in tracking or timing of a progress of a user includes an RFID tag having a mounting substrate with an exposed first planar surface and an opposing second planar surface. At least one of the first and second planar surfaces is adapted for selective attachment to an carrier surface. The RFID tag has an RFID semiconductor chip that is any type of RFID chip and can have a predetermined operating frequency and an antenna interface mounted on the at least one of the first and second planar surfaces. A conductor is electrically coupled to the antenna interface of the RFID semiconductor chip and an antenna is electrically coupled to the conductor. As shown, the antenna can be a bipolar foil antenna. The RFID semiconductor chip and the conductor can each be formed on the mounting surface of the mounting substrate. Similarly, the antenna can be formed on one of the surfaces of the mounting substrate as a foil antenna. The mounting substrate can be any suitable mounting material including a polyester (PET) film.

A spacer composed of a foam material is attached to the second planar surface. The foam material is composed of a material that is non-conducting and non-absorbing of a substantial amount of energy at the predetermined operating frequency. The spacer can be positioned for placement between a surface of the body of the user and the RFID tag for positioning at a minimum spaced apart distance from the surface of the body of the user during operation of the RFID tag assembly. The spacer can be attached to the first or second planar surface of the mounting substrate by an adhesive material or as otherwise suitable for the application. The spacer can be dimensioned to have a spaced apart distance between the operating surface of the body of the user and the mounting substrate that is greater than or equal to about ¼ of a wavelength of the predetermined operating frequency. For example, in one exemplary embodiment the spacer is dimensioned to have a spaced apart distance between a surface of the user body and the mounting substrate of between about 0.125 inches and about 0.5 inches.

Figure 13:
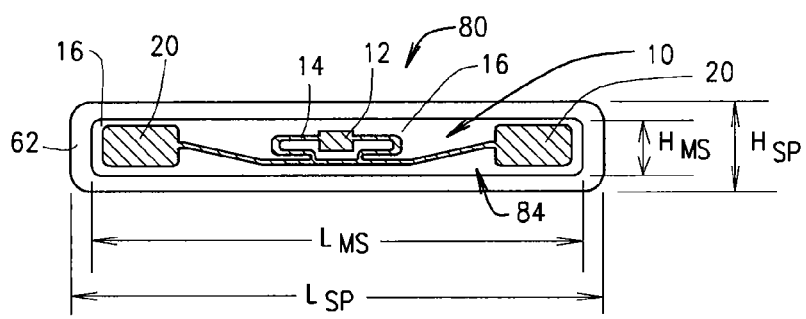
FIG. 13 is a top view of an RFID tag assembly illustrating the dimensions of the RFID tag in relationship to the dimensions of the foam insert according to one exemplary embodiment.

The mounting substrate of the RFID tag assembly can be a substantially planar mounting substrate having a length, a width and a thickness. The thickness of the mounting substrate can be the distance between the first planar surface and the opposing second planar surface. The length of the spacer can be a length and width that is substantially equal to or greater than the length and width of the RFID tag assembly mounting substrate, respectively. As such, the spacer can encircle or enclose the mounting substrate. An example of an RFID tag assembly 80 is shown in FIG. 13. As shown, the length of the spacer $L_{SP}$ is greater than the length of the mounting substrate $L_{MS}$ and the height of the spacer $H_{SP}$ is greater than the height of the mounting substrate $H_{MS}$.

The assembly can also include a mounting body having the carrier surface thereon. The carrier surface can be composed of a non-permeable material and the at least one planar surface is attached to the carrier surface. In such embodiments, the spacer can also be composed of a waterproof non-permeable foam material, such as a high density foam material. As such, the attached spacer and attached carrier surface can provide a substantially moisture proof sealing of the RFID tag assembly from external foreign substances and moisture. The sizing of the spacer and the carrier surface can ensure that the RFID tag assembly is completely enclosed and protected. For example, a race bib can be provided as a mounting body for selective attachment of the RFID tag assembly to a body of a user or vehicle. The race bib can have a front planar surface for placement outward from the user body or operating surface and an opposing back planar surface for placement proximate to and in the direction of the user body or operating surface. The carrier surface can be the front or the back planar surfaces of the race bib. The first planar surface of the mounting substrate can be attached to the back surface of the race bib with an adhesive material and the spacer can be attached to the front surface of the race bib with an adhesive material. The adhesive material can be attached to the first planar surface of the mounting substrate for selective attachment of the assembly to a surface of a carrier, i.e., a carrier surface.

In another embodiment, a method of operating a radio frequency identification (RFID) tag assembly includes mounting a mounting substrate with an RFID semiconductor chip at a spaced apart distance from an operating surface at a distance greater than or equal to about ¼ of a wavelength of a predetermined operating frequency of a radio frequency energy. The operating surface being a surface associated with a body composed of a material that absorbs a substantial amount of energy at the predetermined operating frequency. The method also includes receiving at a first side of a two sided planar antenna coupled to an RFID semiconductor chip mounted in proximity to the operating surface a first portion of that radio frequency energy as transmitted from an antenna associated with a base station transceiver positioned remote from the RFID tag assembly. The first side is oriented away from the operating surface. The method further includes receiving at a second side of the two-sided planar antenna a second portion of the radio frequency energy transmitted from the base station transceiver antenna. The second portion of the radio frequency energy is received at the predetermined operating frequency. The second side is oriented towards the operating surface. The method also includes processing the received first and second portions of the radio frequency energy by the RFID semiconductor chip. The method further includes generating a reply radio frequency energy at the RFID semiconductor chip at a predetermined reply operating frequency in response to the processing and in response to the first and second received radio frequency energy portions. The method includes radiating the reply radio frequency energy by both the first side and the second side of the two-sided planar antenna.

Figure 10:
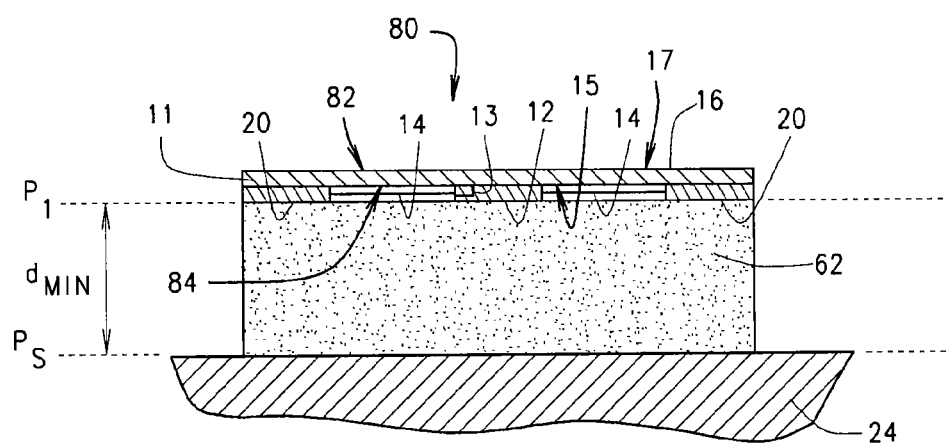
FIG. 10 is a side cross-sectional view of an RFID tag assembly having a foam spacer according to yet another exemplary embodiment.
Figure 14:
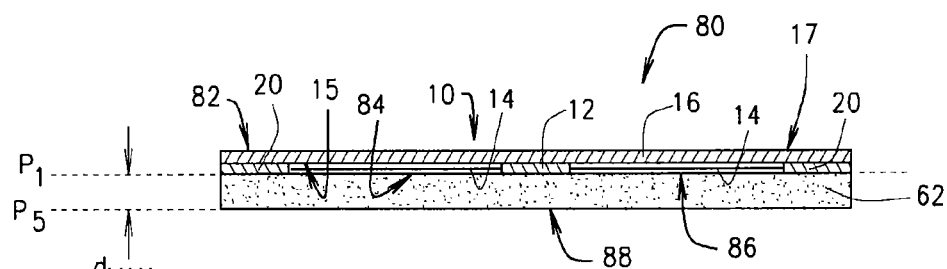
FIG. 14 is a side cross-sectional view of an RFID tag assembly according to another exemplary embodiment.

Referring to the two exemplary embodiments of FIGS. 10 and 14, an RFID tag assembly 80 includes an RFID tag 11 includes an RFID semiconductor chip 12 with an antenna interface (not shown), a conductor 14 and a bipolar antenna 18, which is shown as two first radiating elements 20, and a mounting substrate 16 that has a first surface 82 and a second surface 84. The RFID semiconductor chip 12, conductor 14 and two first radiating elements 20 are each mounted on the second surface 84. A foam spacer 62 is attached to the second surface 15 and about the mounted RFID semiconductor chip 12, conductor 14, and two first radiating elements 20. The spacer 62 can have a thickness such as a minimum thickness of $d_{min}$ such that the spacer spaces the two first radiating elements 20 apart from the surface plane $P_S$ of an operating surface 24. However, in some embodiments, $d_{min}$ can be the sum of the thickness of the spacer, and any other expected nonconductive material that is expected to be present between the first plane P1 containing the first radiating elements and the operating surface. As such, the thickness of the spacer can be less than the ¼ wavelength or the total $d_{min}$ in some embodiments.

Figure 11:
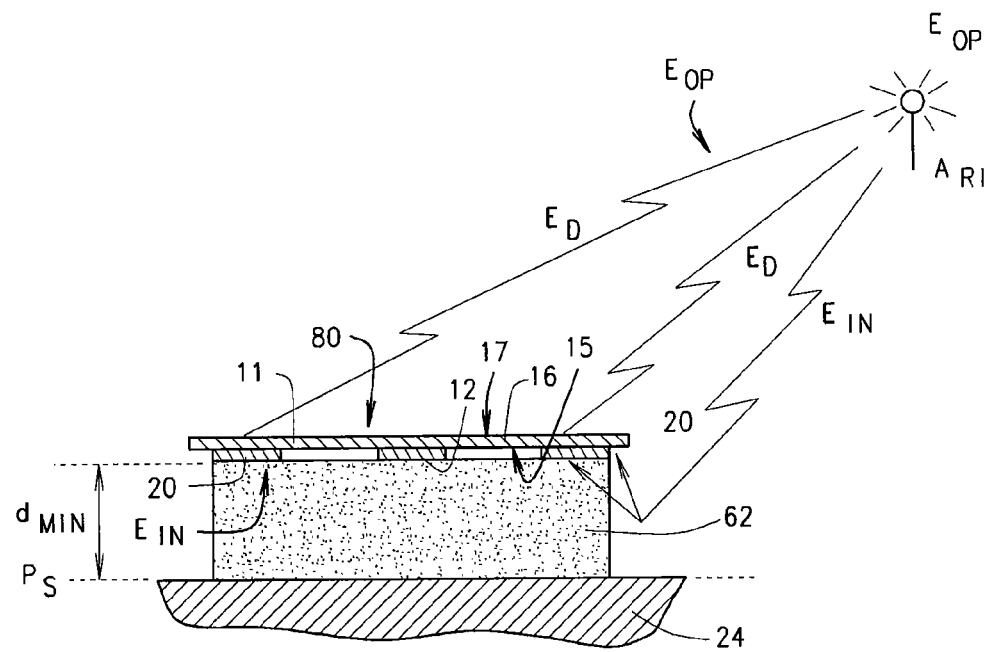
FIG. 11 is a side cross-sectional view of an RFID tag assembly having a foam spacer according to another exemplary embodiment.

In operation, as illustrated by example in FIG. 11, operating energy $E_{OP}$ is propagated between a transceiver antenna $A_{R1}$ and one or both of the first radiating elements 20. As shown in this embodiment, there is no carrier or attachment surface. This includes direct propagated energy $E_D$ and indirect propagated energy E. As shown, the amount of indirect propagated energy $E_{IN}$ can be enhanced by dimensioning of the spacer thickness $d_{min}$. This can also include reducing the absorption of the indirect propagated energy $E_{IN}$ by the spaced apart positioning caused by the spacer thereby limiting the negative effect of energy absorption by the operating surface 24.

Figure 12A:
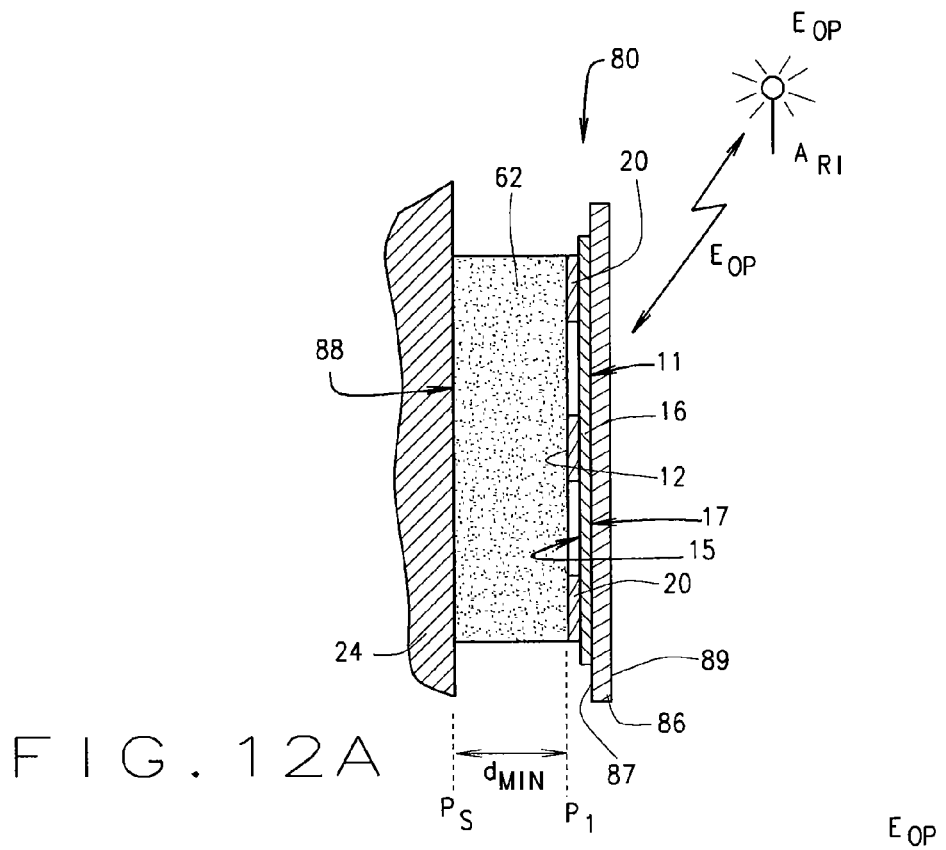
FIGS. 12A and 12B are side cross-sectional views of two RFID tag assemblies mounted on a racing bib as a mounting surface and in relationship to an operating surface according to two additional exemplary embodiments.

In another embodiment, as shown in FIG. 12A, the RFID tag assembly 10 is attached to a carrier 86 that has a front planar surface 89 and an opposing carrier surface 87. The RFID tag assembly 10 is attached by an adhesive (not shown) that is one the first surface 17 of the mounting substrate 16 that is opposite of the second surface 15 on which the RFID tag assembly components are mounted. The spacer 62 is attached as in the embodiment of FIG. 11 and has an outer surface 88 that is positioned for engagement against the operating surface 24 for ensuring that the minimum distance $d_{min}$ is maintained during operation.

Figure 12B:
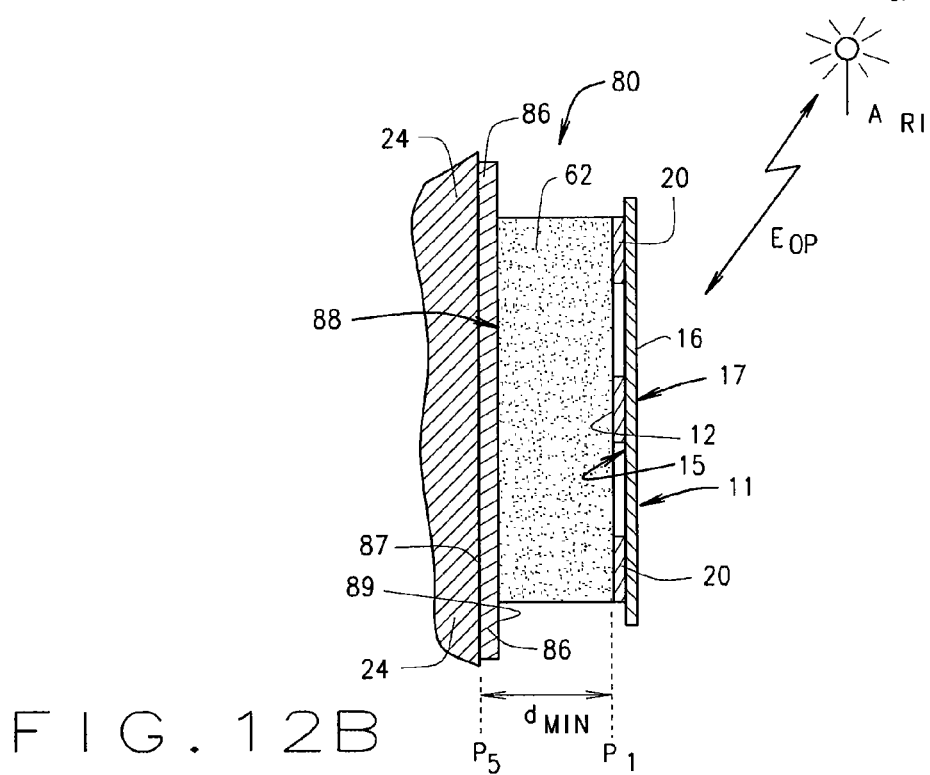

FIG. 12B illustrates another embodiment where with the carrier 86 being positioned between the RFID tag assembly 10 and the operating surface 24. In this embodiment, the spacer 62 is attached similarly to that described in FIGS. 10 and 11; however, the outer surface of the spacer 62 is attached to the outer surface 89 of the carrier 86 rather than the opposing carrier surface 87. In this manner, the thickness of the carrier and the thickness of the spacer 62 combine to provide for ensuring the minimum distance $d_{min}$ is maintained.

Figures 15A, 15B:
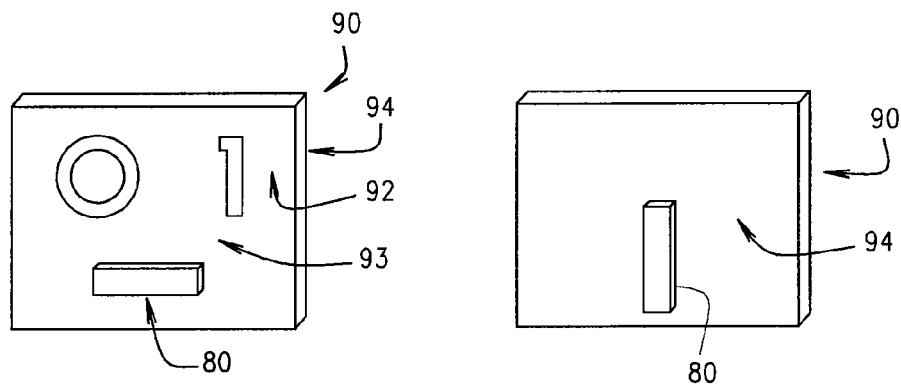
FIGS. 15A and 15B are front and back perspective views, respectively, of two racing bibs as mounting surfaces illustrating placement of the RFID tag on the front and back of the racing bib according to two additional exemplary embodiments.

FIGS. 15A and 15B provide illustrations of two exemplary embodiments of a racing bib 90 having a front exposed surface 92 with indicia 93 that is typical of a racing bib. A back or opposing surface 94 is also provided. FIG. 15A illustrates the placement of the RFID tag assembly 80 on the front exposed surface 92 and FIG. 15B illustrates the placement of the RFID tag assembly 80 on the opposing surface 94.

Figure 16:
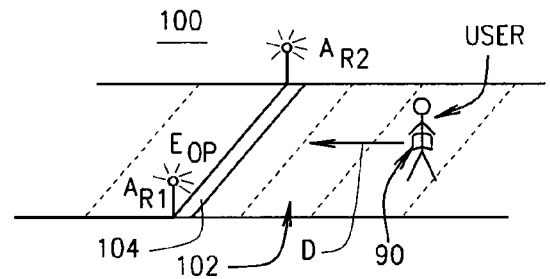
FIG. 16 is a perspective view of an operating environment for an RFID tag assembly for use in timing the progress of a user in a racing event according to one exemplary embodiment.

FIG. 16 is a perspective view of an operating environment for an RFID tag assembly 80 such as for timing the progress of a user in a racing event using a racing bib 90 as illustrated in FIG. 15A or 15B, by way of examples. As shown, the racing bib 90 is worn by the user whom is running along track 102 and approaching timing point 104. Timing point 104 may be any timing point and can include a finish line of track 102. Transceiver antenna $A_{R1}$ and $A_{R2}$ are mounted proximate to the timing point 104 for exchanging operating energy $E_{OP}$ with the RFID tag assembly 80 mounted on the bib 90.

Figure 17:
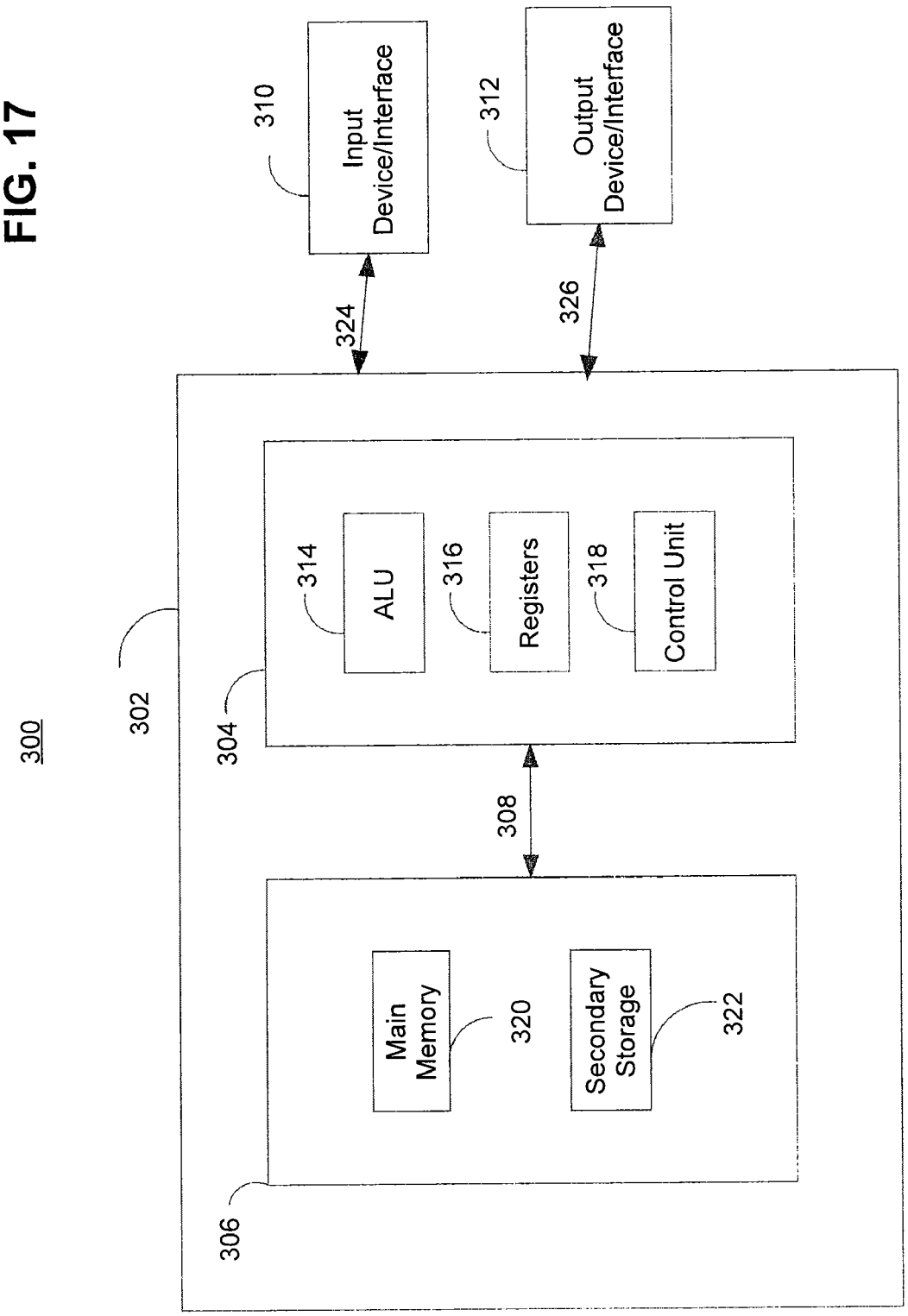
FIG. 17 is a block diagram of a specialized computer system suitable for implementing one or more assembly or methods of various embodiments as described herein.

Referring to FIG. 17, an operating environment for an illustrated embodiment of the an RFID semiconductor chip and/or remote transceiver is a computer system 300 with a computer 302 that comprises at least one high speed processing unit (CPU) 304, in conjunction with a memory system 306 interconnected with at least one bus structure 308, an input device 310, and an output device 312. These elements are interconnected by at least one bus structure 308. As addressed above, the input and output devices can include a communication interface including an antenna interface.

The illustrated CPU 304 for an RFID semiconductor chip is of familiar design and includes an arithmetic logic unit (ALU) 314 for performing computations, a collection of registers for temporary storage of data and instructions, and a control unit 316 for controlling operation of the computer system 300. Any of a variety of processors, including at least those from Digital Equipment, Sun, MIPS, Motorola, NEC, Intel, Cyrix, AMD, HP, and Nexgen, is equally preferred but not limited thereto, for the CPU 304. The illustrated embodiment of the invention operates on an operating system designed to be portable to any of these processing platforms.

The memory system 306 generally includes high-speed main memory 320 in the form of a medium such as random access memory (RAM) and read only memory (ROM) semiconductor devices that are typical on an RFID semiconductor chip. However, the present disclosure is not limited thereto and can also include secondary storage 322 in the form of long term storage mediums such as floppy disks, hard disks, tape, CD-ROM, flash memory, etc. and other devices that store data using electrical, magnetic, and optical or other recording media. The main memory 320 also can include, in some embodiments, a video display memory for displaying images through a display device (not shown). Those skilled in the art will recognize that the memory system 306 can comprise a variety of alternative components having a variety of storage capacities.

Where applicable, while not typically provided on RFID tags or chips, an input device 310, and output device 312 can also be provided. The input device 310 can comprise any keyboard, mouse, physical transducer (e.g. a microphone), and can be interconnected to the computer 302 via an input interface 324 associated with the above described communication interface including the antenna interface. The output device 312 can include a display, a printer, a transducer (e.g. a speaker), etc, and be interconnected to the computer 302 via an output interface 326 that can include the above described communication interface including the antenna interface. Some devices, such as a network adapter or a modem, can be used as input and/or output devices.

As is familiar to those skilled in the art, the computer system 300 further includes an operating system and at least one application program. The operating system is the set of software which controls the computer system's operation and the allocation of resources. The application program is the set of software that performs a task desired by the user, using computer resources made available through the operating system. Both are typically resident in the illustrated memory system 306 that may be resident on the RFID semiconductor chip.

In accordance with the practices of persons skilled in the art of computer programming, the present invention is described below with reference to symbolic representations of operations that are performed by the computer system 300. Such operations are sometimes referred to as being computer-executed. It will be appreciated that the operations which are symbolically represented include the manipulation by the CPU 304 of electrical signals representing data bits and the maintenance of data bits at memory locations in the memory system 306, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 306.

By way of one exemplary embodiment, a multi-ground plane UHF energized RFID assembly as included in the disclosure can improve the performance of an RFID tag when it is being used in a harsh environment such as for the purposes of timing participants in sporting, or similar, events. In some embodiments, the RFID assembly can provide a small form factor, minimal drag, protection from harsh environments and potential damage, extended read distances up to 5.5 meters (18 feet), and additional spacing between an RFID tag and a surface on which it is mounted, such as the human body. The RFID assembly can be designed to operate at temperatures from about 29° C. (−20° F.) to about 60° C. (140° F.) and depths of up to about 2.74 meters (9 feet). As described, in some embodiments such an RFID assembly can include a compressed folded multi-ground plane dipole antenna for transmitting and receiving RF energy coupled to the RFID tag. In such a passive timing chip, the received RF energy powers the RFID tag.

As known to those skilled in the art after reviewing this disclosure, the dimensions and deformation angle, and the antenna and reflector and spacer components can provide an optimization of the RF pattern. Such optimization can improve the strength of the energy at the predetermined operating frequency received by the RFID semiconductor chip, generated by the RFID assembly, and received by the remote transceiver. As discussed, some of or all of the improvements in the transmitted and received energy strength occurs in part due to the interaction of a base ground plane component or radiating element in the first plane and the angled ground plane component or radiating element in the second plane. The RFID tag assembly can also be optimized for operation over a specific range of frequencies. In some of the embodiments, the antenna can be optimized for the UHF spectrum ranging from 902 to 928 megahertz, but can function satisfactorily down to 865 megahertz. In addition to the RFID tag assembly, in some embodiments, the RFID assembly includes a foam-core non-conductive spacer, and a reflector that are used to enhance the performance of the tag. The multi-ground planes in conjunction with the spacer can provide for minimizing the effect of the absorption of the RF energy by a human body that is in close proximity to the RFID assembly.

The RFID assemblies of the present disclosure, in one or more embodiment as disclosed herein, or as otherwise implemented, can provide one or more of a number of advantages over existing RFID tag solutions commonly used in harsh operating environments such as, for example, the field of sports timing. By way of just one example, the described integration of the components including a hardened plastic enclosure, a compressed folded multi-ground plane dipole antenna, a rigid foam-core non-conductive spacer, and a reflector can provide a unique solution that meets the needs of many types of events, including sporting events such as triathlons, adventure races, motocross, and mountain bike races, to name a few. The other embodiments and variations of the RFID assembly as described herein can provide similar benefits and operating use of RFID assemblies.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A radio frequency identification (RFID) tag assembly comprising:
    an RFID semiconductor chip having an antenna interface mounted on a mounting surface of a mounting substrate and having a predetermined operating frequency;
    a conductor electrically coupled to the antenna interface of the RFID semiconductor chip and formed on the mounting surface of the mounting substrate;
    an antenna electrically coupled to the conductor, the antenna including a first radiating element lying in a first plane and a second radiating element lying in a second plane, the second plane being at an angle relative to the first plane; and
    an enclosure having a body defining a cavity with a closed end and an opening, the cavity being dimensioned for receiving the mounting substrate with the RFID semiconductor chip, the conductor, and the first and second radiating elements, the mounting substrate being positioned proximate to the closed end of the cavity;
    a reflector defining a reflective plane spaced apart from and substantially parallel to the first plane, said reflector being positioned proximate to the opening of the cavity at a spaced apart distance from the first plane with the reflective plane being a distance of about ¼ of a wavelength of the predetermined operating frequency; and
    a seal for closing the opening and sealing the cavity.

2. The assembly of claim 1, further comprising a spacer positioned between the first plane and the reflector for maintaining the spaced apart position of the reflector from the first radiating element, wherein the spacer is composed of a material that does not conduct or absorb a substantial amount of energy at the predetermined operating frequency.

3. The assembly of claim 1 wherein the enclosure is configured for mounting to an operating surface with the reflector being positioned between the operating surface and the mounting substrate and the reflective plane being positioned towards the mounting substrate and away from the operating surface.

4. The assembly of claim 1 wherein the reflector is composed of a composite potting compound configured for reflecting energy at the predetermined operating frequency, the potting compound having a dielectric constant responsive to the predetermined operating frequency and providing a capacitive coupling to the antenna, the potting compound further acting as the seal.

5. The assembly of claim 1 wherein the antenna is a bi-planar foil antenna and the first and second radiating elements of the antenna are each foil radiating elements formed on the mounting surface of the mounting substrate, and wherein the mounting substrate includes an angled deformation between the first and second radiating elements defining the angle of the second radiating element relative to the second radiating element.

6. The assembly of claim 1 wherein the first radiating element and the second radiating element are each formed from a common body, the second radiating element extending from an end portion of the first radiating element at a location defined the angle therebetween.

7. The assembly of claim 1 wherein the second radiating element extends from the first plane in a direction towards the reflector and the opening of the cavity.

8. The assembly of claim 1 wherein the antenna is a foil structure defining the first radiating element and the second radiating element.

9. The assembly of claim 6 wherein the antenna has a monolithic body having a first end defining both the first radiating element and the second radiating element.

10. The assembly of claim 1, further comprising a mounting substrate on which the first and second radiating elements are formed, the substrate being deformed at the angle between the first and second radiating elements.

11. The assembly of claim 1 wherein the first radiating element has a length less than about ¼ of a wavelength of the predetermined operating frequency and the second radiating element has a length less than about ¼ of the wavelength of the predetermined operating frequency.

12. The assembly of claim 1 wherein the angle between the second radiating element and an end of the first radiating element is about 90 degrees.

13. The assembly of claim 1 wherein the angle between the second radiating element and an end of the first radiating element is between about 45 degrees and about 135 degrees.

14. The assembly of claim 1 wherein the reflector is the seal.

15. The assembly of claim 1 wherein the antenna is a first antenna component of a bipolar antenna, the bipolar antenna also comprising a second antenna component electrically coupled to the conductor, the second antenna component including a third radiating element lying in the first plane and a fourth radiating element lying in a third plane.

16. A radio frequency identification (RFID) tag assembly comprising:
   means for processing received radio frequency identification requests and generating responses to such requests;
   means for receiving and transmitting radio frequency energy in a first plane at a predetermined operating frequency between the means for processing and a remote transceiver;
   means for receiving and transmitting radio frequency energy in a second plane at a predetermined operating frequency between the means for processing and a remote transceiver, the second plane being at an angle relative to the first plane;
   an enclosure having a body defining a cavity with a closed end and an opening, the cavity being dimensioned to receive and enclose the means for processing and means for receiving and transmitting in a first plane and means for receiving and transmitting in a second plane;
   means for closing and sealing the cavity of the enclosure including the means for processing and means for receiving and transmitting in a first plane and means for receiving and transmitting in a second plane; and
   means for reflecting a portion of the radio frequency energy at the predetermined operating frequency between the remote transceiver and both the means for receiving and transmitting in a first plane and the means for receiving and transmitting in a second plane, said means for reflecting including a reflector defining a reflective plane spaced apart from and substantially parallel to the first plane of the means for receiving and transmitting, said reflector being positioned proximate to the opening of the cavity at a spaced apart distance from the first plane of the means for receiving and transmitting with the reflective plane being a distance of about ¼ of a wavelength of the predetermined operating frequency.

17. A method of manufacturing an RFID tag assembly for use in a harsh operating environment comprising:
   structuring an antenna electrically coupled to an RFID semiconductor chip having an antenna interface with a conductor, the RFID semiconductor chip operating at a predetermined operating frequency, said structuring forming the antenna to have a first radiating element lying in a first plane and a second radiating element lying in a second plane at an angle relative to the first plane;
   forming an enclosure having a body defining a cavity with a closed end and an opening, the body being formed from a material that does not conduct or absorb a substantial amount of energy at the predetermined operating frequency, the cavity dimensioned for receiving and enclosing the RFID semiconductor chip, conductor and structured antenna positioned proximate to the closed end of the cavity;
   mounting the RFID semiconductor chip, conductor and first and second radiating elements of the antenna within the cavity proximate to the closed end of the cavity;
   placing a reflector having a substantially planar reflecting plane spaced apart from and substantially parallel to the first plane, the reflector having a body composed of reflecting material configured for reflecting the predetermined operating frequency, the reflector being mounted proximate to the opening to the cavity; the reflector defining a reflective plane spaced apart from and substantially parallel to the first plane containing the first radiating element, said reflector being positioned proximate to the opening of the cavity at a spaced apart distance from the first plane containing the first radiating element with the reflective plane being a distance of about ¼ of a wavelength of the predetermined operating frequency; and
   closing the opening of the cavity containing the RFID semiconductor chip, conductor, reflector and antenna, said closing including sealing the opening.

18. The method of claim 17 wherein the first radiating element is formed to have a length less than about ¼ of a wavelength of the predetermined operating frequency and the second radiating element is formed to have a length less than about ¼ of the wavelength of the predetermined operating frequency.

19. The method of claim 17 wherein the second radiating element is formed to have the angle relative to the first plane of about 90 degrees.

20. The method of claim 17 wherein the second radiating element is formed to have the angle relative to the first plane of between about 45 degrees and about 135 degrees.

21. The method of claim 17 wherein the second radiating element is formed to extend from the first plane in the direction of the opening of the cavity.

22. The method of claim 17 wherein the second radiating element is formed to extend from the first plane in the direction of the opening of the cavity and the reflector.

23. The method of claim 17 wherein the body of the reflector is composed of a composite material and wherein placing the reflector includes closing the opening of the cavity.

24. The method of claim 17, further comprising inserting a spacer between the first plane and the reflector for maintaining the spaced apart position of the reflector from the first radiating element.

25. The method of claim 24 wherein the spacer is composed of a material that does not conduct or absorb a substantial amount of energy at the predetermined operating frequency.

26. The method of claim 17 wherein placing the reflector includes forming the body of the reflector to define the reflective plane from a composite material having a dielectric constant responsive to the predetermined operating frequency.

27. The method of claim 26 wherein forming the body of the reflector includes mixing in a predetermined amount of a reflective substance into the composite material.

28. The method of claim 17 wherein structuring the antenna includes structuring the first and second radiating elements as foil structures.

29. The method of claim 17 wherein structuring the antenna includes modifying an RFID tag assembly formed on a mounting substrate having the RFID semiconductor chip, conductor and a preformed planar foil antenna formed thereon, the preformed antenna lying in the first plane and having a length equal to or greater than about ½ of a wavelength of the predetermined operating frequency, wherein structuring the antenna includes cutting an end portion of the mounting surface and the preformed antenna formed thereon to form a reduced length antenna having a length of the antenna to less than about ½ of the wavelength of the predetermined operating frequency and deforming an end of the reduced length antenna at the angle to form an angled deformation between the second radiating element defined at the end of the antenna and the first radiating element being a portion of the reduced length antenna that is not deformed, the first and second radiating elements each having a length of less than about ¼ of the wavelength of the predetermined operating frequency.

30. The method of claim 29 wherein the angle of the deformation is about 90 degrees.

31. The method of claim 29 wherein the angle of the deformation is between about 45 degrees and about 135 degrees.

32. The method of claim 17 wherein the RFID tag assembly has a bipolar antenna having a first component and an opposing second component,
wherein structuring the antenna includes modifying an RFID tag assembly formed on a mounting substrate having the RFID semiconductor chip, conductor and a preformed planar foil bipolar antenna formed at opposing ends of the mounting substrate, the two components of the preformed bipolar antenna lying in the first plane and each component having a length equal to or greater than about ½ of a wavelength of the predetermined operating frequency, wherein structuring the antenna includes cutting a portion of each of the opposing ends of the mounting substrate to form cut ends of two reduced length antenna components each having a length less than about ½ of the wavelength of the predetermined operating frequency, and deforming each cut end of each reduced length antenna components at the angle to form two angled deformations defining the angle between each second radiating element component defined at each cut end of the reduced length antenna component and each first radiating element as formed as a portion of the reduced length antenna that is not deformed, each of the first and second radiating elements having a length of less than about ¼ of the wavelength of the predetermined operating frequency.

* * * * *